US012088341B2

(12) United States Patent
Laguna et al.

(10) Patent No.: US 12,088,341 B2
(45) Date of Patent: Sep. 10, 2024

(54) PHOTONIC BEAMFORMING FOR ACTIVE ANTENNAS

(71) Applicant: Airbus Defence and Space Limited, Stevenage (GB)

(72) Inventors: Victor Manuel Fernandez Laguna, Portsmouth (GB); Katarzyna Balakier, Portsmouth (GB); Stephen Brown, Portsmouth (GB); Niall Macmanus, Portsmouth (GB)

(73) Assignee: Airbus Defence and Space Limited, Stevenage (GB)

( * ) Notice: Subject to any disclaimer, the term of this patent is extended or adjusted under 35 U.S.C. 154(b) by 0 days.

(21) Appl. No.: 18/564,837

(22) PCT Filed: Jun. 10, 2022

(86) PCT No.: PCT/EP2022/065853
§ 371 (c)(1),
(2) Date: Nov. 28, 2023

(87) PCT Pub. No.: WO2022/258815
PCT Pub. Date: Dec. 15, 2022

(65) Prior Publication Data
US 2024/0275487 A1 Aug. 15, 2024

(30) Foreign Application Priority Data

Jun. 11, 2021 (EP) .................................... 21179110

(51) Int. Cl.
*H04B 10/118* (2013.01)
*H04B 10/112* (2013.01)
*H04B 10/2575* (2013.01)

(52) U.S. Cl.
CPC ....... *H04B 10/118* (2013.01); *H04B 10/1129* (2013.01); *H04B 10/25759* (2013.01)

(58) Field of Classification Search
None
See application file for complete search history.

(56) References Cited

U.S. PATENT DOCUMENTS

| 4,736,463 | A | * | 4/1988 | Chavez | ................... H01Q 3/34 359/107 |
| 10,481,463 | B2 | * | 11/2019 | Nejadriahi | ............ G02F 1/0147 |
| 10,534,110 | B2 | * | 1/2020 | Tennant | ................... H01Q 5/22 |
| 11,283,168 | B2 | * | 3/2022 | Bourderionnet | ... H04B 10/2575 |
| 2009/0067772 | A1 | * | 3/2009 | Khurgin | ............... H01Q 3/2676 385/3 |

(Continued)

FOREIGN PATENT DOCUMENTS

EP 3180873 B1 3/2018

OTHER PUBLICATIONS

Pan et al., Satellite Payloads Pay Off, IEEE, 2015 (Year: 2015).*

(Continued)

*Primary Examiner* — Jai M Lee
(74) *Attorney, Agent, or Firm* — Nelson Mullins Riley & Scarborough LLP

(57) ABSTRACT

Optical Fast Fourier Transforms are described for use in photonic beamforming systems. Transmit and Receive photonic beamforming systems for use with active array antennas are described, together with digital and photonic payloads for use with such beamforming systems.

16 Claims, 10 Drawing Sheets

(56) References Cited

U.S. PATENT DOCUMENTS

2014/0320346 A1* 10/2014 Caille ............... G02B 6/29386
385/24

OTHER PUBLICATIONS

Duarte et al., Modular coherent photonic-aided payload receiver for communications satellites, Nature Communications, 2019 (Year: 2019).*

Nov. 8, 2022 Search Report issued in International Patent Application No. PCT/EP2022/065853; 7 pp.

Nov. 8, 2022 Written Opinion of the International Searching Authority issued in International Patent Application No. PCT/EP2022/065853; 17 pp.

Duarte Vanessa et al: "Coherent photonic true-time-delay beamforming system for a phased array antenna receiver;" 2016 18th International Conference on Transparent Optical Networks (ICTON), IEEE; Jul. 10, 2016 (Jul. 10, 2016), pp. 1-5; XP000788840; XP032950144; DOI: 10.1109/ICTON.2016.7550663.

Duarte Vanessa et al: "Modular and smooth introduction of photonics in high-throughput communication satellites—perspective of project BEACON;" SPIE Proceedings; [Proceedings of SPIE ISSN 0277-786X], SPIE, US, vol. 11180, Jul. 12, 2019 (Jul. 12, 2019), pp. 1118079-1118079; XP060125685; DOI: 10.1117/12.2536180; ISBN: 978-1-5106-3673-6.

Haraguchi Eisuke et al: "Demonstration of separation of multiple beams using quadrant detector in optical beamforming for receiving antenna;" 2017 IEEE International Conference on Space Optical Systems and Applications (ICSOS), IEEE, Nov. 14, 2017 (Nov. 14, 2017), pp. 138-141; XP033339250; DOI: 10.1109/ICSOS.2017.8357223.

Xiaoke Yi et al: "Programmable multiple true-time-delay elements based on a Fourier-domain optical processor;" Optics Letters, Optical Society of America, US, vol. 37, No. 4; Feb. 15, 2012 (Feb. 15, 2012), pp. 6068-6610; XP001574147, ISSN: 0146-9592; DOI: 10.1364/OL.37.000608 [retrieved on Feb. 9, 2012].

Pan Shilong et al: "Microwave Photonic Radars;" Journal of Lightwave Technology, IEEE, USA, vol. 38, No. 19; May 7, 2020 (May 7, 2020), pp. 5450-5484; XP011808366, ISSN: 0733-8724; DOI: 10.1109/JT.2020.2993166 [retrieved on Sep. 10, 2020].

Sep. 18, 2023 International Preliminary Report on Patentability issued in International Patent Application No. PCT/EP2022/065853; 25 pp.

* cited by examiner

PHOTONIC BEAMFORMING FOR ACTIVE ANTENNAS

CROSS-REFERENCE TO RELATED APPLICATIONS

This application claims priority to and is a 35 U.S.C. § 371 U.S. National Stage Application of International Application No. PCT/EP2022/065853, entitled "PHOTONIC BEAMFORMING FOR ACTIVE ANTENNAS", filed Jun. 10, 2022, which claims priority to European Application No. 21179110.8, entitled "PHOTONIC BEAMFORMING FOR ACTIVE ANTENNAS", filed Jun. 11, 2021, the contents of each being incorporated by reference herein in its entirety.

FIELD OF THE INVENTION

The present invention relates to microwave photonics, and particularly to photonic beamforming for active antennas used with satellite payloads.

TECHNICAL BACKGROUND

Large active antennas are used increasingly for a wide variety of applications including radio telecommunication systems, very high throughput satellites (VHTS), radar devices and global navigation systems, among others. One of the key enablers for the operation of active antennas is beamforming technology, which allows directionality of signals transmitted from or received at the active antennas to be manipulated based on control of the phase between individual elements of the active antenna array.

Typically, beamforming is performed using analogue radiofrequency (RF) and digital technologies. Photonic beamformers represent an alternative implementation offering multiple benefits. For example, photonic beamforming is capable of operating across wide frequency bands, whilst allowing flexibility in the beam allocation. Further, photonic beamforming systems utilise optical fibres which are quick to assemble, offer high density of fibres per connector, are flexible, and have a low bend radius, when compared to the waveguides or coax cables employed in typical RF beamforming networks. Of particular note for deployment in satellite payloads, photonic beamforming systems can be designed to consume low power and provide a low weight and compact design.

A typical approach to photonic beamforming is to use a fully dynamic 'true time delay' (TTD) system to apply the phase shifts necessary for beamforming to the incoming signals. A TTD beamforming solution relies on controlling the relative phase and delay between signals from each antenna element. This results in N×N control inputs for a system comprising N antenna elements. Such a system is disclosed in "Photonic True-Time Delay Beamforming Based on Polarization-Domain Interferometers" by Drummond et al. (Journal Of Lightwave Technology, Vol. 28, No. 17, Sep. 1, 2010), which relies on tuneable TTD lines to provide the phase shifts necessary for beamforming.

As the complexity of the control architecture scales quadratically with the number of antenna elements, implementation of optical beamforming for large antenna arrays becomes challenging. Thus, the payload capacity of a TTD optical beamformer is limited by this complexity.

Embodiments of the present invention aim to provide an improved implementation of optical beamforming. This reduction is achieved by the use of an optical fast Fourier transform (OFFT) network in a photonic beamforming system.

SUMMARY OF INVENTION

According to an aspect of the present invention, there is provided a photonic beamforming system for a satellite payload, comprising: a modulation stage configured to modulate a plurality of electrical signals from a plurality of antenna elements receiving one or more signal beams, onto an optical carrier, to output a respective plurality of optical signals; and an optical fast Fourier transform (OFFT) network comprising a plurality of 2×2 optical FFT couplers, each optical FFT coupler arranged to apply a phase shift between a pair of the plurality of optical signals input to the optical FFT coupler, such that the OFFT network outputs a plurality of beamformed signals corresponding to a plurality of beam angles defined by phase shifts applied by each optical FFT coupler.

Each of the plurality of optical FFT couplers in the OFFT network may comprise a tuneable phase shifter at each of its inputs, wherein each tuneable phase shifter may be controlled by a respective beamforming control input.

Each of the plurality of optical FFT couplers in the OFFT network may comprise, a tuneable phase shifter at one of its inputs, and a fixed phase shifter at the other of its inputs, wherein the tuneable phase shifter is controlled by a respective beamforming control input.

The photonic beamforming system may further comprise a switching stage, configured to select a subset of the beamformed signals output by the OFFT for processing at the payload.

The switching stage may be configured to select the subset of the beamformed signals according to a beamhopping scheme.

According to another aspect of the present invention, there is provided a photonic beamforming system for a satellite payload, comprising: an optical inverse fast Fourier transform, OIFFT, network comprising a plurality of 2×2 optical FFT couplers, each optical FFT coupler arranged to apply phase shifts between a pair of a plurality of optical signals input to the OIFFT network, such that the OIFFT network outputs a plurality of beamformed optical signals for one or more beams defined by phase shifts applied by each optical FFT coupler; and a conversion stage configured to convert the plurality of beamformed optical signals into electrical signals for transmission in the one or more beams by a plurality of antenna elements.

Each of the plurality of optical FFT couplers in the OIFFT network may comprise a tuneable phase shifter at each of its inputs, wherein each tuneable phase shifter may be controlled by a respective beamforming control input.

Each of the plurality of optical FFT couplers in the OIFFT network may comprise a tuneable phase shifter at one its inputs, and a fixed phase shifter at the other of its inputs, wherein the tuneable phase shifter may be controlled by a respective beamforming control input.

The photonic beamforming system may further comprise an optical switch and/or splitter configured to switch and/or split at least one of the input signals into a plurality of input signals for provision to the OIFFT.

According to another aspect of the present invention, there is provided a photonic satellite payload comprising a first photonic beamforming system as described above, arranged to receive a plurality of signals from a first plurality of antenna elements; one or more photonic signal processors arranged to process the plurality of beamformed signals output by the first photonic beamforming system; and a second photonic beamforming system as described above, arranged to receive a plurality of signals output by the one or more photonic signal processors and to output one or more transmit beams via a second plurality of antenna elements.

The modulation stage may further comprise a plurality of electro-optical, EO, modulators, and the photonic beamforming system may further comprise: a conversion stage, comprising a plurality of photodetectors configured to convert the plurality of beamformed signals output by the OFFT network to the electrical domain; and an optical frequency generation unit arranged to supply the optical carrier and an optical local oscillator signal for the conversion stage.

The photonic beamforming system may further comprise: a modulation stage configured to modulate a plurality of electrical signals from the satellite payload onto an optical carrier, to output a respective plurality of optical signals for input to the OIFFT network; wherein the conversion stage may comprise a plurality of photodetectors; and the photonic beamforming system may further comprise an optical frequency generation unit arranged to supply the optical carrier and an optical local oscillator signal for the conversion stage.

According to another aspect of the present invention, there is provided a satellite payload comprising: a first photonic beamforming system as described above, arranged to receive a plurality of signals from a first plurality of antenna elements; one or more digital signal processors arranged to process the plurality of electrical beamformed signals output by the first photonic beamforming system; and a second photonic beamforming system as described above, arranged to receive a plurality of electrical signals output by the one or more digital signal processors and to output one or more transmit beams via a second plurality of antenna elements.

According to another aspect of the present invention, there is provided a satellite comprising a payload as described above.

According to another aspect of the present invention, there is provided an interference cancellation system, comprising a photonic beamforming system as described above, an interference monitoring stage configured to monitor the output of the OFFT network for one or more interfering signals, and determine a one or more respective interfering beam angles of the one or more interfering signals; a nulling stage, configured to null the one or more interfering beam angles in the output of the OFFT network; and an OIFFT network, configured to reconstruct the signal input to the photonic beamforming system without the one or more interfering beam angles.

As will become clear from the subsequent disclosure, embodiments of the present invention are associated with a reduction in the number of control inputs which are required in order to achieve beamforming for a given number of antenna elements, compared with existing implementations. Embodiments of the present invention therefore enable provision of high capacity to a satellite payload due the improved scalability which is provided.

DETAILED DESCRIPTION

Embodiments of the present invention are described below in the context of a satellite payload which processes RF, or other frequency-band signals received via an uplink link, for transmission, via a downlink. The payload may be digital or photonic.

RF signals are transmitted and received by one or more active antennas, each comprising an array of antenna elements, controllable as a phased array. The signals are transmitted and received in one or more beams, having coverage areas defined according to a particular schedule to which the satellite payload is synchronised.

The directivity of the beams is dependent upon the control of the antenna elements by photonic beamforming systems. In the case of a receive (Rx) network, photonic beamforming systems according to embodiments of the present invention operate to apply phase offsets to input signals such that a number of beamformed signals representing inputs received at each of a plurality of respective beam angles, relative to, for example, the boresight of the Rx antenna, are output. Information contained within associated beams is processed by the payload processor. The relative phase offsets are applied to a pair of antenna elements signals to define a direction from which signals received at the corresponding pair of antenna elements combine constructively.

In the case of a transmit (Tx) network, photonic beamforming systems according to embodiments of the present invention operate to control the phase offset between pairs of elements of the Tx antenna which cause constructive interference between signals transmitted from those pairs in the desired beam direction.

Embodiments of the present invention relate to the Rx and Tx photonic beamforming systems in isolation, which can be fitted to and used with satellite payloads and antennas. Other embodiments of the present invention relate to payloads comprising digital or photonic processors, and Rx and Tx photonic beamforming systems, for use with antennas.

Rx Beamforming System

Figure 1:
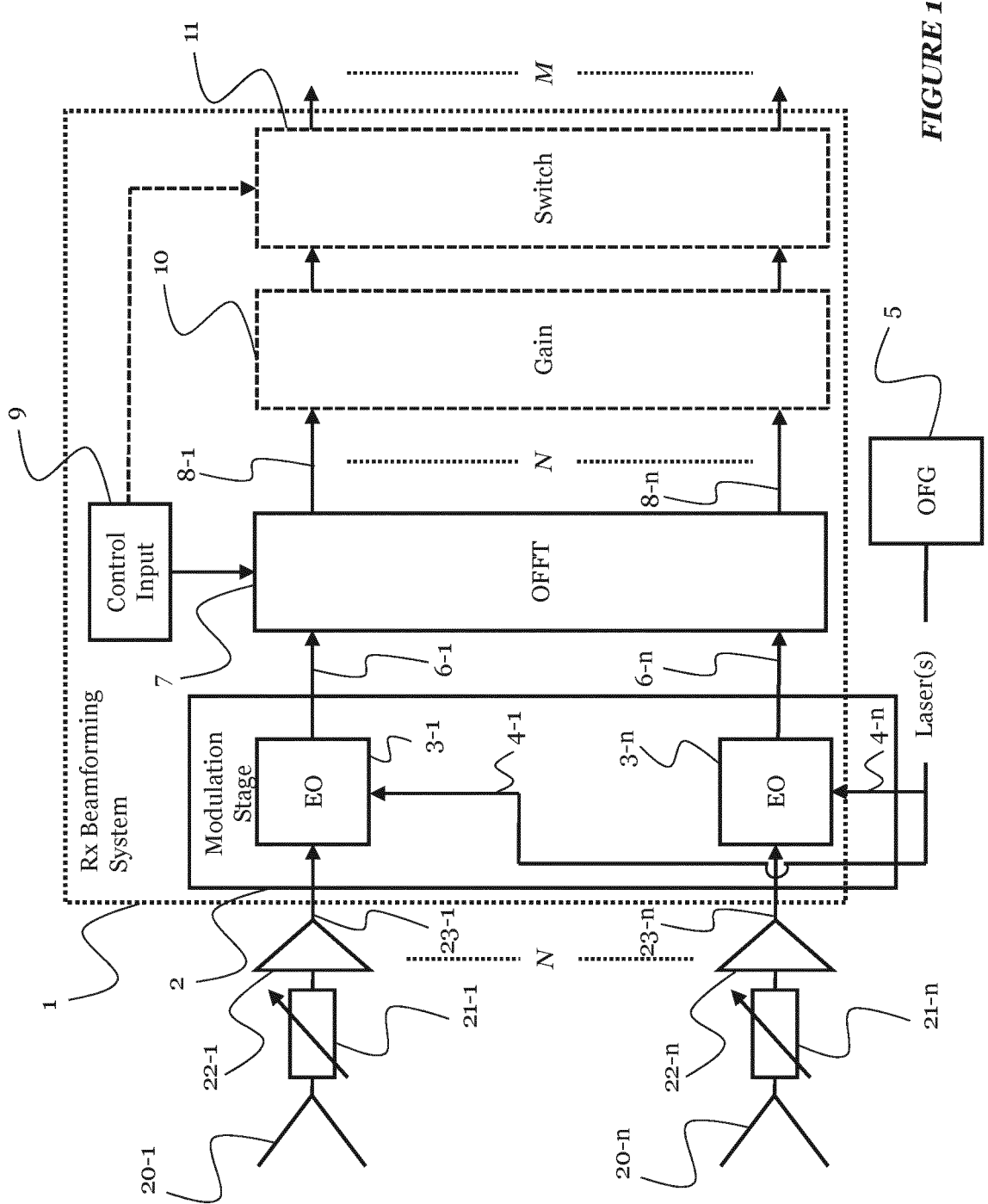
FIG. 1 shows an Rx photonic beamforming system, according to embodiments of the present invention.

FIG. 1 is a schematic showing an Rx photonic beamforming system 1 according to embodiments of the present invention. The photonic beamforming system 1 receives signals from each of N elements 20-1 . . . 20-n of an Rx antenna, converts them into the optical domain and, using an optical fast Fourier transform (OFFT) network 7, resolves the directionality of the received signals into beams based on their respective beam angles.

In the present embodiments, at least some of the beamformed signals 8-1 . . . 8-n are output for processing by one or more payload processors. The beamformed signals 8-1 . . . 8-n are formed of a summation of each of the signals 23-1 . . . 23-n from the N elements 20-1 . . . 20-n, with phase shifts between them which cause constructive interference between the signals 23-1 . . . 23-n in the direction of a particular beam angle.

The signal path is shown from left to right in FIG. 1, through a series of what are referred to herein as "stages", representing modules, subsystems, networks, units or components associated with respective functions. Each stage may, in some embodiments, be physically distinct, and here, in the analogue and digital domains, signals are transmitted between stages via electrical cables. In the optical domain, signals are transmitted between stages via optical fibres. In alternative embodiments, some or all of the stages may be physically combined, for example as photonic integrated circuits. These conventions will be adopted throughout the following description.

N signals are received at respective N antenna elements 20-1 . . . 20-n arranged as an array. The signals may be microwave or RF signals, but may correspond to any suitable frequency band required by the payload.

The received signals are conditioned as known in the art, by removal of noise using, for example, attenuators 21-1 . . . 21-n, and amplification 22-1 . . . 22-n, and fed into the Rx photonic beamforming system 1 as electrical signals 23-1 . . . 23-n.

In the beamforming system 1, the N input signals 23-1 . . . 23-n are converted into the optical domain in a modulation stage 2. Each of the N input signals modulates a respective optical carrier 4-1 . . . 4-n of a particular wavelength. In the present embodiment, the wavelength of each optical carrier 4-1 . . . 4-n is the same, and the optical carriers 4-1 . . . 4-n are co-generated by a frequency generation unit 5. The plurality of optical signals 6-1 . . . 6-n produced by the modulation stage 2 are input into a OFFT stage or network 7 for beamforming.

At least some of the beamformed signals 8-1 . . . 8n provided by the OFFT network 7 are output for processing by one or more processors on-board a payload.

The OFFT network 7 is configured to apply the fast Fourier transform (FFT) operation to the plurality of optical signals 6-1 . . . 6-n output from the modulation stage 2, which transforms the input signals 6-1 . . . 6-n into outputs 8-1 . . . 8-n associated with each of a plurality of beam angles. The beam angles are dependent on phase offsets applied between pairs of signals, and by controlling the phase offsets by a series of control inputs 9 to the OFFT network 7, it is possible to control the beamforming system as desired to obtain the beams which are required.

The typical FFT algorithm is derived from the discrete Fourier transform (DFT) of a sequence of N of samples $x_n$ ($0 \leq n \leq N-1$) where $N=2^L$ and L is an integer number. The DFT involves summing the N samples in which each sample $x_{j+1}$ ($0 \leq j \leq N-1$) is phase shifted, relative to its respective adjacent sample $x_j$ by a particular phase offset $\phi$. The phase offset between each sample is, when expressed in radians, $(2\pi/N) \cdot k$, for output $X_k$ in the DFT sequence, for $0 \leq k \leq N-1$.

Mathematically, this is represented by equation 1, for complex number i:

$$X_k = \sum_{n=0}^{N-1} x_n \cdot e^{-\frac{i2\pi}{N}kn} \qquad \text{Equation 1}$$

To speed up the process of calculating the DFT, the FFT divides the N input samples into "odd" and "even" sub-matrices and creates two smaller DFT problems of size N/2, as shown in equation 2:

$$X_k = \begin{cases} E_k + O_k \cdot e^{-\frac{i2\pi}{N}kn} & \text{if } k < \frac{N}{2} \\ E_{k-N/2} - O_k \cdot e^{-\frac{i2\pi}{N}kn} & \text{if } k \geq \frac{N}{2} \end{cases} \qquad \text{Equation 2}$$

This division process can be repeated iteratively on each sub-matrix up to 24-1 times, at which the point the size of the respective "odd" and "even" sub-matrices is equal to 2. Each of these $2^{L-1}$ DFTs is computed and summed to generate the full DFT solution.

In embodiments of the present invention, the OFFT network 7 is used to calculate the FFT, in a process analogous to that described above. In this case, the N samples represent the plurality of optical signals 6-1 . . . 6-n, provided to the OFFT network 7 by the modulation stage 2.

The process of computing the solution to the $2^{L-1}$ "odd" and "even" sub-matrices is performed using multiple 2×2 optical couplers (for example, with asymmetric directional couplers or multi-mode interferometers), each referred to herein as a 2×2 optical FFT coupler 30, each coupler being analogous to a single two-element matrix. As described with reference to FIG. 2, this computation is achieved by controlling the input phase at the two input ports 33-1, 33-2 of the coupler 30.

Figure 2:
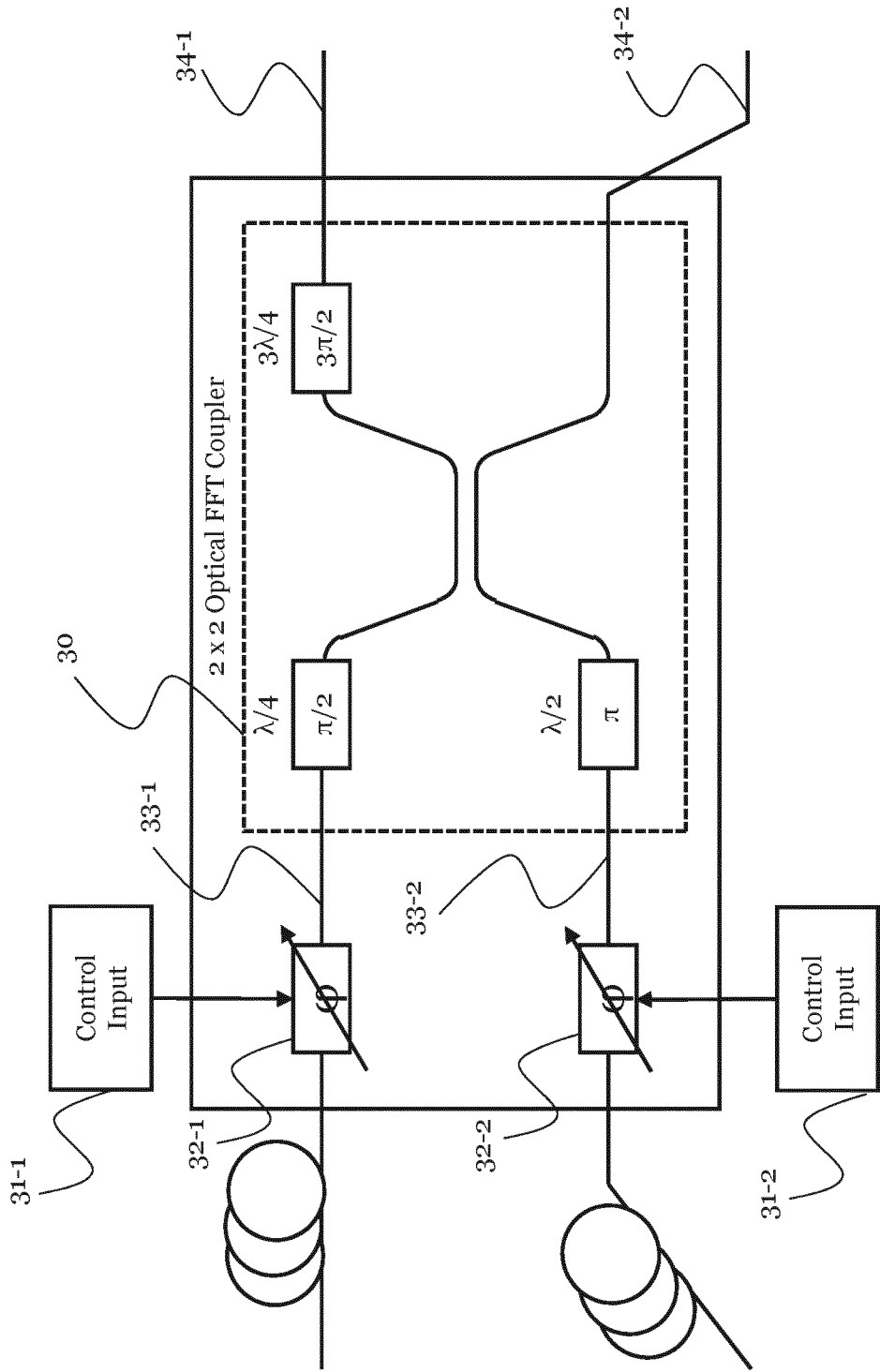
FIG. 2 shows a 2×2 optical FFT coupler, with two tuneable input ports, according to embodiments of the present invention.

The operation of a 2×2 optical FFT coupler 30 is analogous to a quadrature hybrid coupler (QHC), and is represented in FIG. 2 as receiving an input optical signal at each of its two input ports 33-1, 33-2, which may be controllably phase shifted by a respective tuneable phase shifter 32-1, 32-2 before coupling. As the signals progress through the coupler, they interfere with one another, producing, at one of the two output ports 34-1 of the coupler, the sum of the two input signals, and at the other output port 34-2, the difference between the two input signals.

As the relative phase between input signals to the coupler may be controlled, it is possible to define whether the signals interfere constructively or destructively. The phase input is selected by control inputs 31-1, 31-2 to the tuneable phase shifters 32-1, 32-2 such that the respective phase shifts required to satisfy equation (1) can be applied to the optical signals appropriately, for particular values of k, n and N. Additionally, the ability to control the phase shifts in this manner allows for correction of phase error brought about by, for example, manufacturing or temperature variations across the coupler during operation. In the case of temperature-effect compensation, a part of the control input to the coupler may form part of a feedback loop comprising a temperature sensor in proximity to the coupler, and an algorithm executed by the on-board controller of the payload which determines the necessary phase shift dynamically.

The control inputs 31-1, 31-2 may be provided by a controller that forms part of the payload. Alternatively, the control inputs 31-1, 31-2 may be provided as part of a signal received from a ground station.

In embodiments of the present invention, $2^{L-1}$ 2×2 optical FFT couplers 30 are arranged in each of L 'ranks' in order to process N signals. This process is analogous to computing $2^{L-1}$ two-element sub-matrices when implementing the FFT. As will be appreciated by those skilled in the art, it is possible to arrange a total of $L \cdot 2^{L-1}$ couplers 30 in this manner to provide calculation of the FFT for N input signals. Since each coupler has two control inputs 31-1, 31-2, the OFFT network 7 as a whole will thus require $N \log_2(N)$ control inputs.

Figure 3:
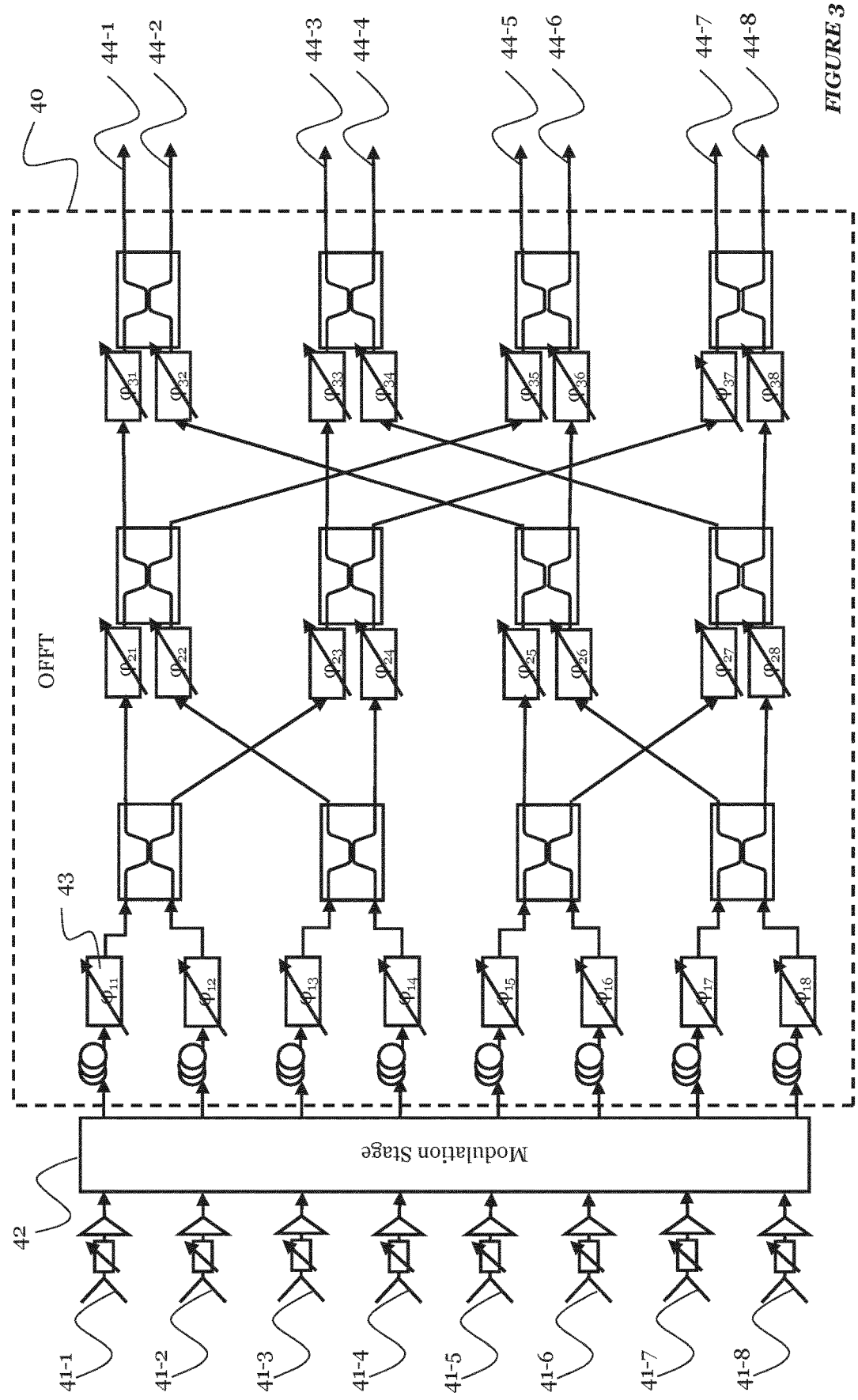
FIG. 3 shows an 8×8 optical fast Fourier transform network, according to embodiments of the present invention.

An example of an 8×8 OFFT network 40 is shown in FIG. 3, according embodiments of the present invention. Here, signals are received at the antenna elements 41-1 . . . 41-8, modulated onto an optical carrier in a modulation stage 42 and passed through the 8×8 OFFT network 40. This outputs eight beamformed signals 44-1 . . . 44-8, each associated with a respective beam angle.

As described above, for N signals 23-1 . . . 23-$n$, the OFFT network 7 requires $N \log_2(N)$ control inputs in order to output N beamformed optical signals 8-1 . . . 8-$n$. In the case of the 8×8 beamforming system 40 of FIG. 3, the number of control inputs required correspond to the number of tuneable phase shifters 43 and is equal to 24.

More generally, in some embodiments, an N-points OFFT network 7 may be comprised of K interconnected modules where each module performs an (N/K)-points FFT. Each of the K modules, based on OFFT photonic integrated circuits (PICs), may be formed using the same manufacturing process to improve consistency of structure and performance, as well as enabling scalability.

The specific use of an OFFT network 7 in beamforming thus offers a reduction in complexity when compared to a typical TTD beamforming system, which requires N×N control inputs 9. For an antenna having 1,000 elements, for example, it will thus be appreciated that whereas a typical TTD beamforming system would require 1,000,000 control points, a beamforming system according to embodiments of the present invention would require only 3,000. Embodiments are therefore particularly scalable, in addition to being much more compact than is possible with typical devices. Payload capacity can be significantly increased as a result, enabling very high throughput satellite applications which can meet growing demands in satellite traffic. Further, the photonic beamforming systems described herein can provide perfect power pooling. As the photonic beamforming systems are highly scalable, the benefits conferred by this power pooling are also scalable.

Figure 4:
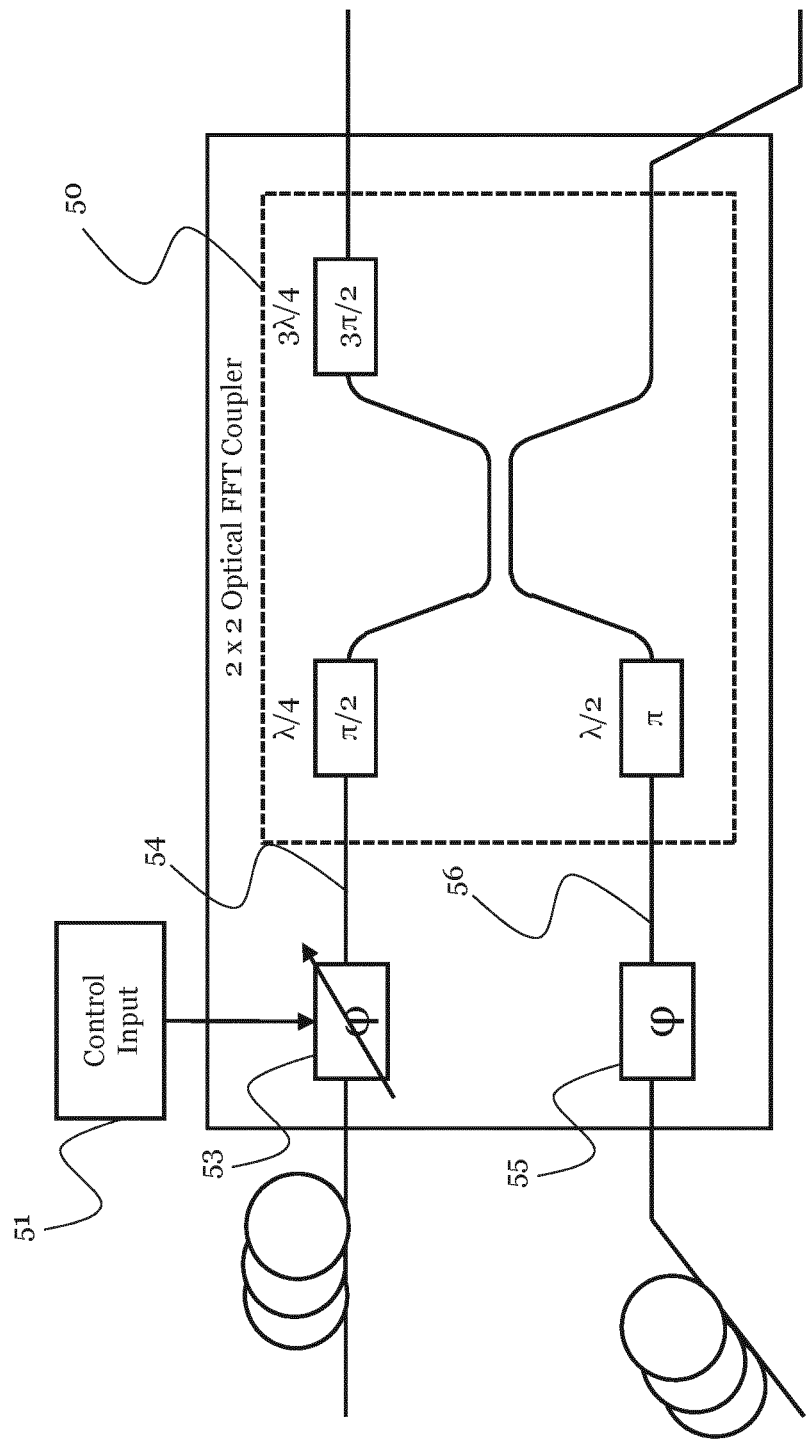
FIG. 4 shows a 2×2 optical FFT coupler, with one tuneable phase input port, and one fixed phase input port, according to embodiments of the present invention.

In some embodiments of the present invention, the 2×2 optical FFT couplers 30 used to control the phase shift between respective pairs of signals 23-1 . . . 23-$n$ in the OFFT network 7 (or in the OIFFT network, to be described in more detail below) may be replaced by the optical FFT coupler 50 of FIG. 4.

Such a coupler 50 implements a fixed phase shift 55 on one of the input ports 56, and a tuneable phase shift 53 on the other input port 54. The tuneable phase shift 53 is controllable via a control input 51. When a plurality of such phase couplers 50 are arranged to form an OFFT network 7 or an OIFFT network, in a manner analogous to the 2×2 optical FFT coupler 30 of FIG. 2, the control inputs 51 are the control inputs of the respective OFFT 7 and OIFFT networks.

The tuneable phase shifter 53 can be used to correct any phase errors (e.g. due to fabrication tolerances or temperature changes) from the surrounding fixed phase shifters 55.

Implementing such a coupler 50 in an OFFT network 7 or an OIFFT network further reduces the number of control inputs 9 from $N \log_2(N)$ to $(N/2) \log_2(N)$. With reference to FIG. 3, this would reduce the number of control inputs required for an 8×8 OFFT network 40 from 24 to 12. Scalability is thus further improved, lending yet higher capacity to the payload.

In some embodiments, before being output to the payload processor, the plurality of beamformed signals 8-1 . . . 8-$n$ may be amplified in an amplification stage 10, as shown in FIG. 1, to compensate for insertion losses in the stages preceding the output of the beamforming system 1. Additionally or alternatively to the gain stage 10, a switching stage 11 may be implemented to select a subset of M beams that are to be output to the payload processor, for M s N. The switching stage 11 may receive a control input (not shown), which may be provided by the on-board controller of the payload, or from a ground station. The application of gain and/or switching 10, 11 is optional.

In the case where N is large and N=M, that is to say that the processor is capable of processing N ports, the switching stage 11 is not essential. In this case, the processor may be scaled to the number of ports and may include signal regeneration, due to the power savings afforded by removing the digital beamformer. Such a scheme may be suitable for a photonic payload, as the need for a digital beamforming network in the payload may be removed.

In the case where N is low, neither of the amplification 10 or switching stages 11 is essential. Such a scenario may be suitable for use with a digital payload where the low number of beams enables a digital beamforming stage to be readily implemented by the payload processor. In such systems, the beamforming operations can be considered as a hybrid technology in which the photonic beamforming system of embodiments of the present invention takes the role of the analogue beamforming network of an RF system.

For the case where N is very large, both the amplification 10 and switching 11 stages may be required. In this case, a dynamic enough switching stage 11 could allow for beam-hopping.

As described above, the modulation stage 2 is configured to modulate a plurality of electrical signals received from the plurality of antenna elements 20-1 . . . 20-$n$, onto an optical carrier 4-1 . . . 4-$n$, to output a plurality of optical signals 6-1 . . . 6-$n$ for subsequent beamforming. The modulation stage 2 may comprise a plurality of N electro-optical (EO) modulators 3-1 . . . 3-$n$, corresponding to the N input signals 23-1 . . . 23-$n$. Each of the NEO modulators 3-1 . . . 3-$n$ is supplied with a laser signal derived from a master laser in an optical frequency generation unit 5, which serves as the optical carrier 4-1 . . . 4-$n$, at a wavelength of, for example, 1310 nm or 1550 nm. The optical frequency generation (OFG) unit 5 may receive a control input (not shown) to determine the wavelength of the generated laser beam. The control input may be provided by the on-board controller of the payload, or from a ground station.

According to embodiments of the present invention, the signals output from the beamforming system 1 of FIG. 1 may be further processed and converted to the electrical domain. A conversion stage 66 and a plurality of analogue-to-digital converters (ADCs) 70-1 . . . 70-$n$ allow for processing of the signals by one or more digital signal processors in the digital payload.

Figure 6:
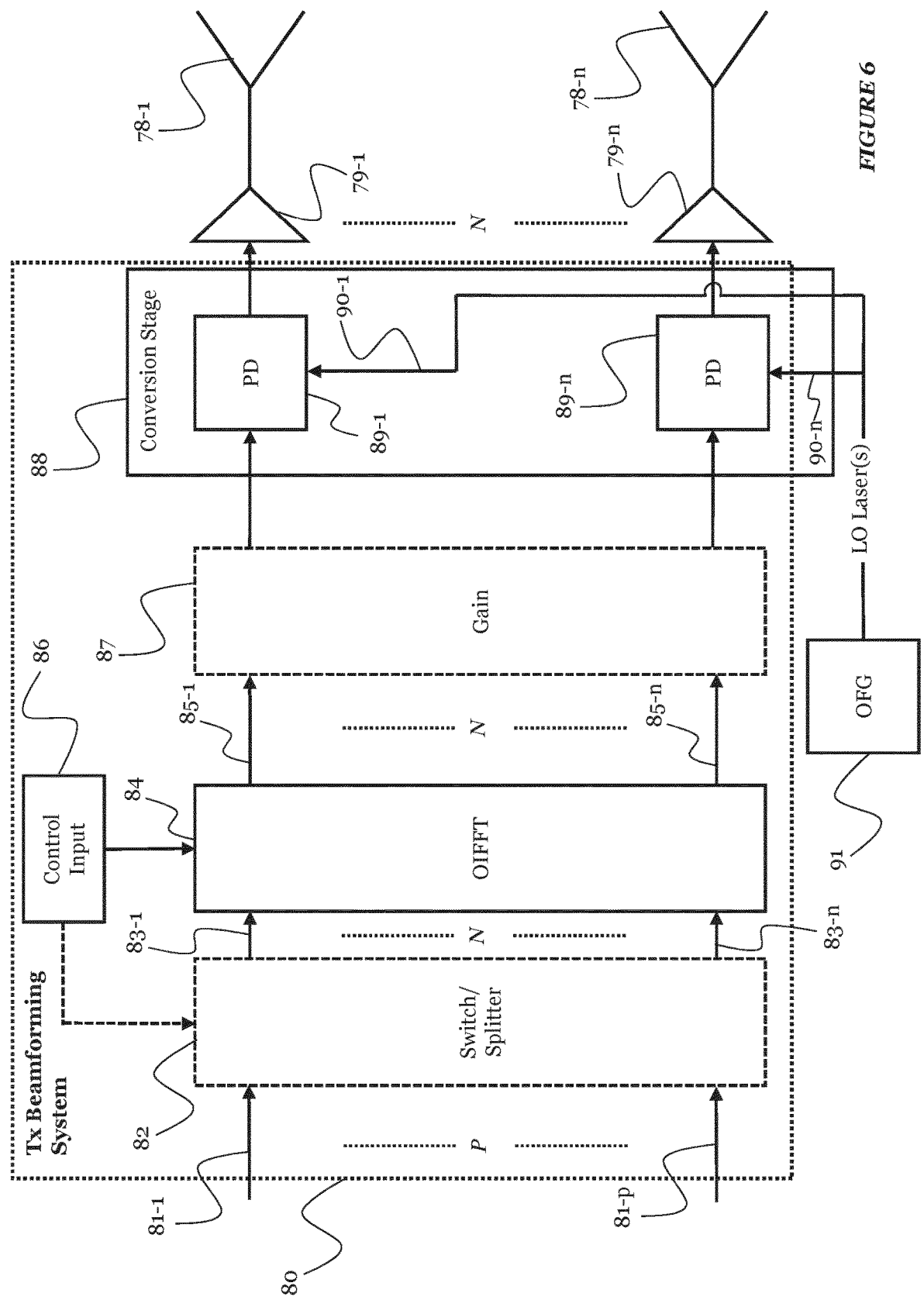
FIG. 6 shows a Tx photonic beamforming system, according to embodiments of the present invention.

In embodiments of the present invention, as shown in FIG. 6, such a conversion stage 66 is configured to receive, as input, M beamformed optical signals 65-1 ... 65-$m$ and output M electrical beamformed signals 69-1 ... 69-$m$. The M electrical beamformed signals 69-1 ... 69-$n$ are output to M ADCs 70-1 ... 70-$n$ for digital processing.

The conversion stage 66 comprises of a plurality of photodetectors 67-1 ... 67-$m$ (PD) configured to convert the plurality of beamformed signals 65-1 ... 65-$m$ output by the OFFT network 63 to the electrical domain. Each PD 67-1 ... 67-$m$ performs the conversion by demodulating the optical signal using a corresponding optical local oscillator 68-1 ... 68-$m$ (LO). In some embodiments, the LO 68-1 ... 68-$m$ has the same wavelength as the optical carrier 62-1 ... 62-$n$ for homodyne reception and is produced using the optical frequency generation (OFG) unit 64 which generated the optical carrier 62-1 ... 62-$m$. In this manner, substantial coherence between the optical carrier 62-1 ... 62-$n$ and the LO 68-1 ... 68-$m$ is achieved via distribution of the same laser signal to the modulation 61 and conversion 66 stages. In other embodiments, frequency heterodyning is achieved via use of an LO 68-1 ... 68-$m$ with an appropriate wavelength.

As described above, the value of M is equal to or less than N, and in some embodiments there may be N PDs in the conversion stage 66, N LO signals and NADCs to allow for the capability to handle N signals when required, even if at certain times of operation, only M signals are required to be proceed by the payload and only M PDs, M LO signals and M ADCs are in operation (where M<N).

Tx Beamforming System

The principles outlined in relation to the Rx beamforming system 1 apply similarly to a Tx beamforming system 80 according to embodiments of the present invention.

FIG. 6 is a schematic showing a Tx photonic beamforming system 80, according to embodiments of the present invention. The Tx photonic beamforming system 80 receives at least one optical input signal 81-1 ... 81-$p$, to be transmitted at least one respective beam angle. As described below, the optical input signals 81-1 ... 81-$p$ may be output from a photonic payload processor, or converted into the optical domain after output from a digital payload processor, and conversion via digital-to-analogue converters (DACs). Using an optical inverse fast Fourier transform (OIFFT) network 84, the Tx photonic beamforming system 80 transforms the optical input signals 83-1 ... 83-$n$ having passed through switch/splitter 82 into beamformed signals 85-1 ... 85-$n$ to be transmitted by each of N antenna elements 78-1 ... 78-$n$ to produce the designated transmission beams. The value of N need not be the same as the value of N described in conjunction with the Rx beamforming system 1 embodiments, since it is dependent on the transmission antenna design to be employed, which may be the same, or different from the reception antenna of a given payload. The beamformed signals 85-1 ... 85-$n$ are converted to the electrical domain in a conversion stage 88, for subsequent transmission by the antenna elements 78-1 ... 78-$n$.

The signal path is shown from left to right in FIG. 6. As described in relation to the Rx beamforming system 1 of FIG. 1, in the analogue and digital domains, signals are transmitted between stages via electrical cables. In the optical domain, signals are transmitted between stages via optical fibres. In alternative embodiments, some or all of the stages may be physically combined.

In the Tx beamforming system 80, N optical signals 83-1 ... 83-$n$ to be transmitted by N elements 78-1 ... 78-$n$ of a transmission antenna array, at their respective beam angles, are input to the OIFFT network 84. The OIFFT network 84 is configured to apply the inverse fast Fourier Transform (IFFT) to the plurality of N input signals 83-1 ... 83-$n$, which transforms the input signals 83-1 ... 83-$n$ into a plurality of N beamformed signals 85-1 ... 85-$n$ to be transmitted from the N antenna elements 78-1 ... 78-$n$ to generate the desired transmission beams.

The OIFFT network 84 operates in a manner analogous to the operation of the OFFT network 7 outlined above. However, instead of applying phase shifts to the antenna element signals in order to resolve directionality of input beams, the OIFFT network 84 applies phase shifts to the N input signals 83-1 ... 83-$n$ in order to steer transmission beams in the desired direction.

The OIFFT network 84 can be considered "inverse" due to the fact that it converts the signals from spatial-domain to the antenna-domain for transmission, whereas the OFFT network 7 can be considered as converting antenna-domain signals to the spatial-domain after receipt at the antenna array.

The transmitted beam directions are dependent on phase offsets applied between pairs of the N optical input signals 83-1 ... 83-$n$. By controlling the phase offsets by a series of control inputs 86 to the OIFFT network 84, it is possible to control the interference between the N optical input signals 83-1 ... 83-$n$ such that the N beamformed signals 85-1 ... 85-$n$ to be transmitted from elements 78-1 ... 78-$n$ in the antenna array interfere to produce transmission beams in the desired directions.

Control to the OIFFT network 84 may be dependent on the orbital position of a satellite payload to which the Tx beamforming system 80 is coupled. As such, the control inputs 86 to the OIFFT network 84, used to define the directionality of the transmitted beams, may be calculated based on the position of the satellite payload in relation to the surface of the Earth. The relative position of the satellite may be determined by a payload processor, based on orbital data alternatively the position of the satellite may be provided in a signal from a ground station.

Before being output to the antenna array, for transmission, it is necessary to convert the plurality of beamformed signals 85-1 ... 85-$n$ to the electrical domain in a conversion stage 88. The transmitted signals may be microwave or RF signals, but may correspond to any suitable frequency band required by the payload. Before transmission, the signals are conditioned as known in the art, by, for example, high power amplification 79-1 ... 79-$n$.

Figure 5:
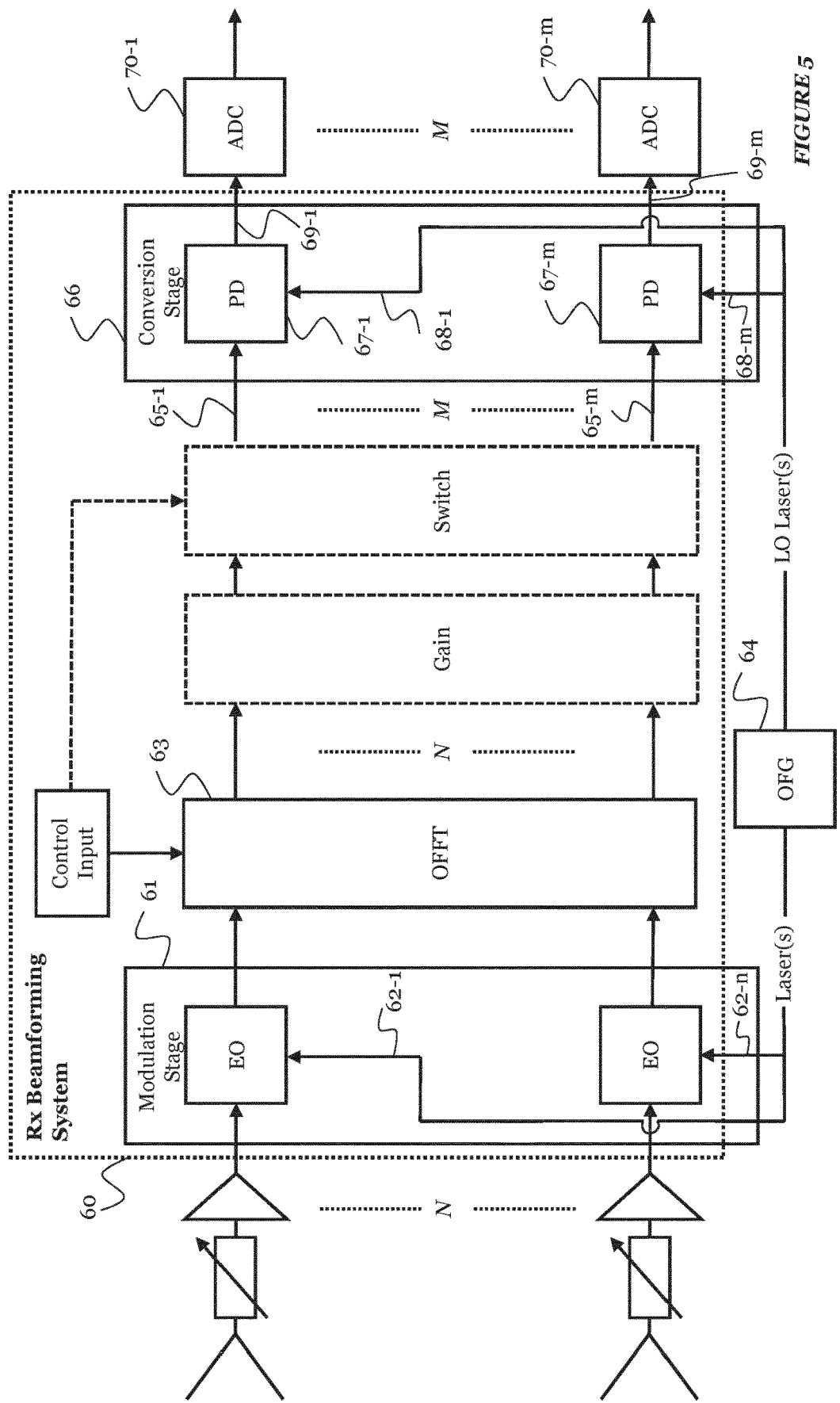
FIG. 5 shows an Rx photonic beamforming system, configured for output to a digital payload processor, according to embodiments of the present invention.

The conversion stage 88 may be analogous to stage 66 described in connection with FIG. 5 in an Rx beamforming system 1 according to some embodiments of the present invention. The conversion stage 88 comprises of a plurality of N photodetectors 89-1 ... 89-$n$ (PD) configured to convert the plurality of beamformed signals 85-1 ... 85-$n$ output by the OIFFT network 84 to the electrical domain. Each PD 89-1 ... 89-$n$ may perform the conversion by demodulating the optical signal using a laser input from an optical local oscillator 90-1 ... 90-$n$ (LO), produced using an optical frequency generation (OFG) unit 91. In the present embodiment, the wavelength of each optical carrier is the same, and the optical carriers are co-generated by the OFG 91. The OFG unit 91 may receive a control input (not shown) to determine the wavelength of the generated laser.

The conversion stage 88 may alternatively employ the N LO lasers 90-1 ... 90-$n$ to perform frequency heterodyning, by use of the appropriate LO laser wavelength.

In some embodiments, a splitting stage 82 is included before signals are input to the OIFFT network 84. Such a stage 82 may be included in the case where it is necessary for the Tx beamforming system 80 to output N transmission signals from P payload processor signals 81-1 . . . 81-p, for N>P. In some embodiments, P may have the same value as M described above in relation to the Rx beamforming system 1 embodiments, but the specific values of M and P are dependent upon the payload processor to be used. The splitting stage 82 may receive a control input (not shown), which may be provided by the on-board controller of the payload, or from a ground station. A switching stage may be used in place of, or in addition to, the splitting stage, dependent on the number of locations on Earth that beam(s) are to be transmitted to and whether beamhopping is to be employed.

Additionally or alternatively to the switching/splitting stage 82, in some embodiments before being output to the conversion stage 88, but after the OIFFT network 84 the plurality of beamformed signals 85-1 . . . 85-n are amplified in amplification stage 87, to compensate for insertion losses in the Tx beamforming system 80. This applies particularly where N is large.

In the case where N=P, the splitting stage 82 is not essential. In this case, due to the power savings afforded by removing the digital beamformer, the payload processor may be scaled to the number of element signals and may include signal regeneration.

According to embodiments of the present invention, the input signals 81-1 . . . 81-p to the beamforming system 80 of FIG. 6 may have been processed by a digital payload processor. In this case it is necessary to convert the signals received from the payload processor to the optical domain for beamforming.

Figure 7:
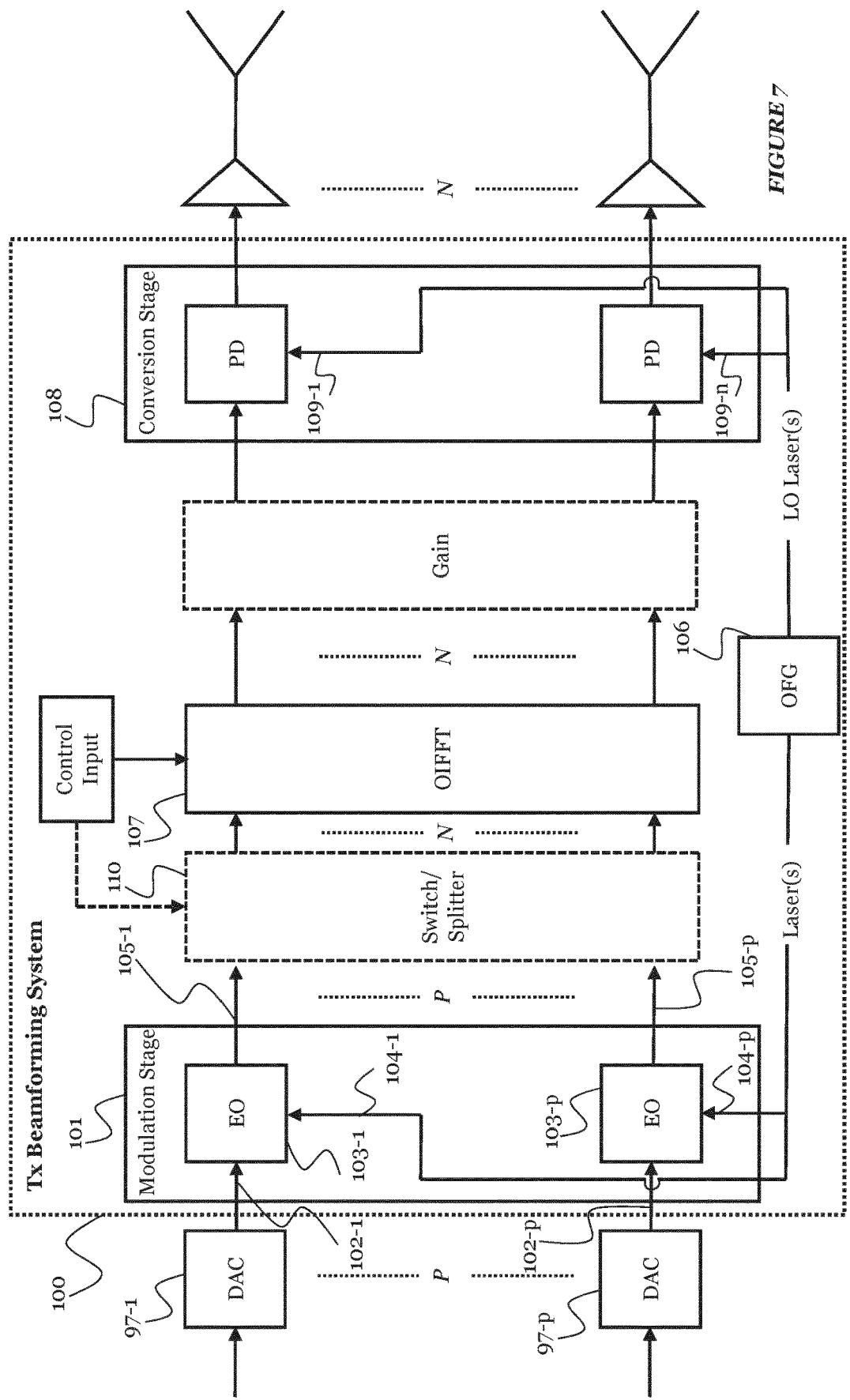
FIG. 7 shows a Tx photonic beamforming system, configured for receipt of output from a digital payload processor, according to embodiments of the present invention.

As described with reference to FIG. 7, embodiments of the present invention may achieve the aforementioned conversion by the inclusion of P digital-to-analogue (DAC) converters 97-1 . . . 97-p and a modulation stage 101 within the Tx beamforming system 100. The modulation stage 101 is configured to modulate the plurality of signals 102-1 . . . 102-p received from the payload processor onto an optical carrier 104-1 . . . 104-p, to output a respective plurality of optical signals 105-1 . . . 105-p for input, via the switch/splitter 110 to the OIFFT network 107.

Each of the P input signals modulates an optical carrier 104-1 . . . 104-p of a particular wavelength. In the present embodiment, the wavelength of each optical carrier 104-1 . . . 104-p is the same, and the optical carriers 104-1 . . . 104-p are co-generated by an optical frequency generation (OFG) unit 106. The plurality of optical signals produced by the modulation stage 101 are input into the OIFFT network 107 for beamforming, as outlined above.

The modulation stage 101 may comprise a plurality of P electro-optical (EO) modulators 103-1 . . . 103-p, corresponding to the signals received from the payload processor. Each of the P EO modulators 103-1 . . . 103-p is supplied with a laser signal derived from a master laser in an optical frequency generation unit 106, which serves as the optical carrier 104-1 . . . 104-p. The OFG 106 unit may receive a control input (not shown) to determine the wavelength of the generated laser.

The laser input received at each of the P EO modulators 103-1 . . . 103-p may be generated using the same OFG unit 106 as used in the production of the LO laser 109-1 . . . 109-n, used for conversion during the conversion stage 108 of the Tx beamforming system 100. Alternatively, the laser input may be produced using an OFG unit 106 different to that used for conversion during the conversion stage 108 of the Tx beamforming system 100.

Photonic Payload

Figure 8:
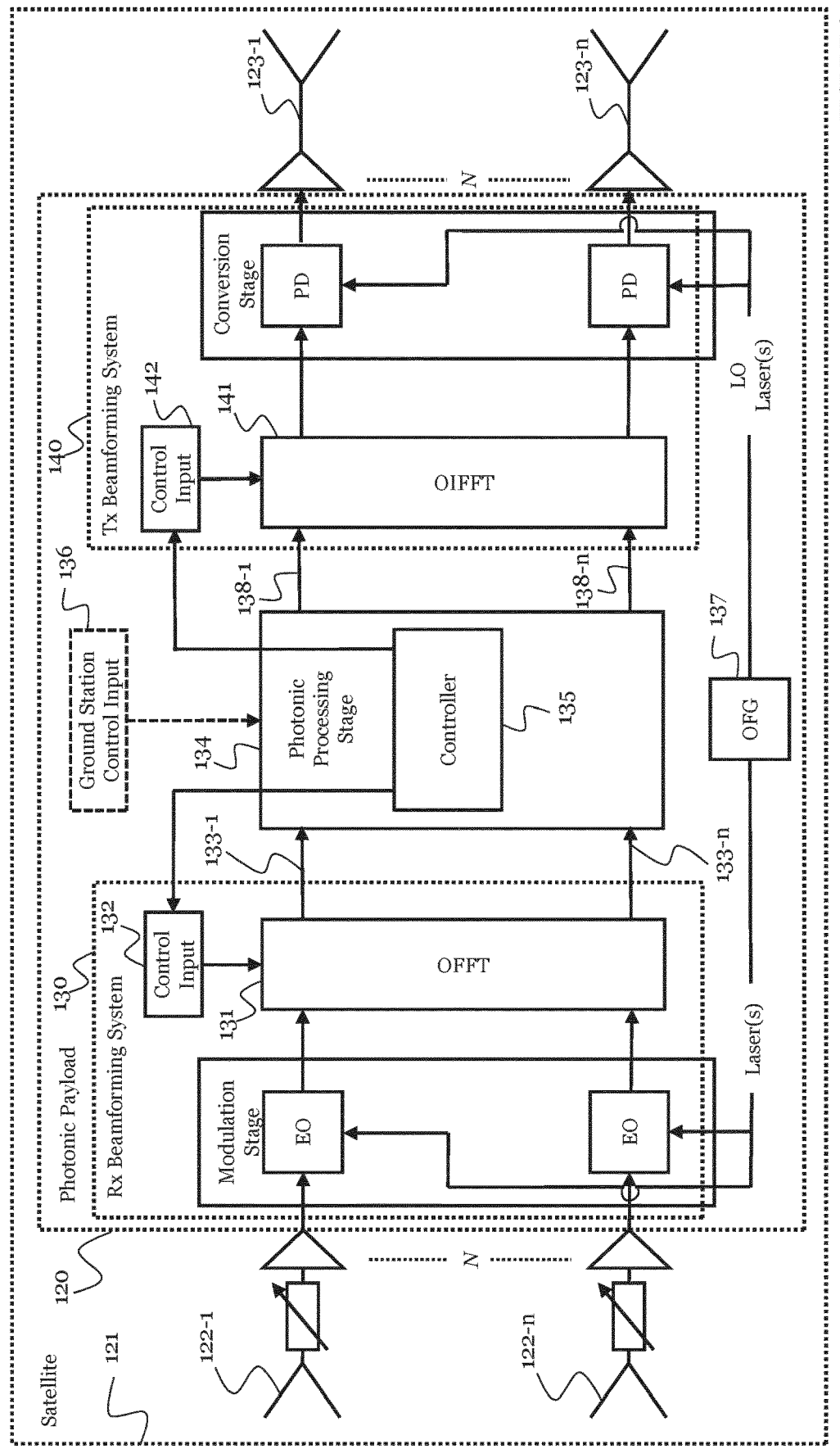
FIG. 8 shows a photonic payload, with photonic Rx and Tx beamforming systems and a photonic payload processor, according to embodiments of the present invention.

According to embodiments of the present invention, a first Rx beamforming system 130 of FIG. 1 and a second Tx beamforming system 140 of FIG. 6 may be connected to a photonic processing stage 134 to form a photonic payload 120, as illustrated in FIG. 8. The payload is illustrated, together with antenna elements 122-1 . . . 122-n and 123-1 . . . 123-n and associated attenuators and amplifiers, within a satellite 121.

With reference to FIG. 8, the beamformed signals 133-1 . . . 133-n output by the Rx beamforming system 130 may be input to one or more photonic signal processors 134. The one or more photonic processors 134 process the beamformed signals 133-1 . . . 133-n including one or more of amplifying, filtering, switching, multiplexing/demultiplexing, combining/splitting, amplitude adjustment, time offset adjustment and phase adjustment. The one or more photonic processors 134 output processed signals 138-1 . . . 138-n to be transmitted to the Earth via the downlink and provides these to the Tx beamforming system 140. The Rx beamforming system 130 and the Tx beamforming system 140 interface with first 122-1 . . . 122-n and second 123-1 . . . 123-n antenna elements respectively. In some embodiments, the first 122-1 . . . 122-n and second 123-1 . . . 123-n antenna elements are associated with physically distinct antennas, but in alternative embodiments, the first 122-1 . . . 122-n and second 123-1 . . . 123-n antenna elements are the same elements of a single antenna array.

The Rx beamforming system 130 may include the optional switching and amplification stages. Similarly, the Tx beamforming system 140 may include the optional splitting and amplification stages. Amplification and switching/splitting stages are not shown in the embodiment illustrated in FIG. 8.

The photonic payload 120 may comprise an on-board controller 135, configured to provide the control input 132 to the OFFT network 131, the OFG 137 in the Rx beamformer 130. Similarly, the payload controller 135 may be configured to provide the control input 142 to the OIFFT network 141, the splitting stage and the OFG 137 in the Rx beamformer 140. The controller 135 may be pre-programmed to provide the control inputs 132, 142 to these devices, additionally or alternatively the controller 135 may receive instruction from a ground station 136 representing the control inputs 132, 142 to provide the beamforming systems 130, 140.

Where present, a control input provided by the controller 135 to the optional switching and splitting stages may facilitate beamhopping operations. Similarly, the control input provided by the controller to the OFG 137 may facilitate frequency heterodyning.

The antenna arrays 122-1 . . . 122-n, 123-1 . . . 123-n of the Rx and Tx beamforming systems 130, 140 may be arranged to be the same array, forming a transceiver antenna arrangement. Alternatively, the antenna arrays 122-1 . . . 122-n, 123-1 . . . 123-n of the Rx and Tx beamforming systems 130, 140 may be different antenna arrays.

Similarly, the OFG 137 of the Rx and Tx beamforming systems 130, 140 may be the same OFG 137. Alternatively, the OFG 137 of the Rx and Tx beamforming systems 130, 140 may be a different OFG (not shown).

Digital Payload

Figure 9:
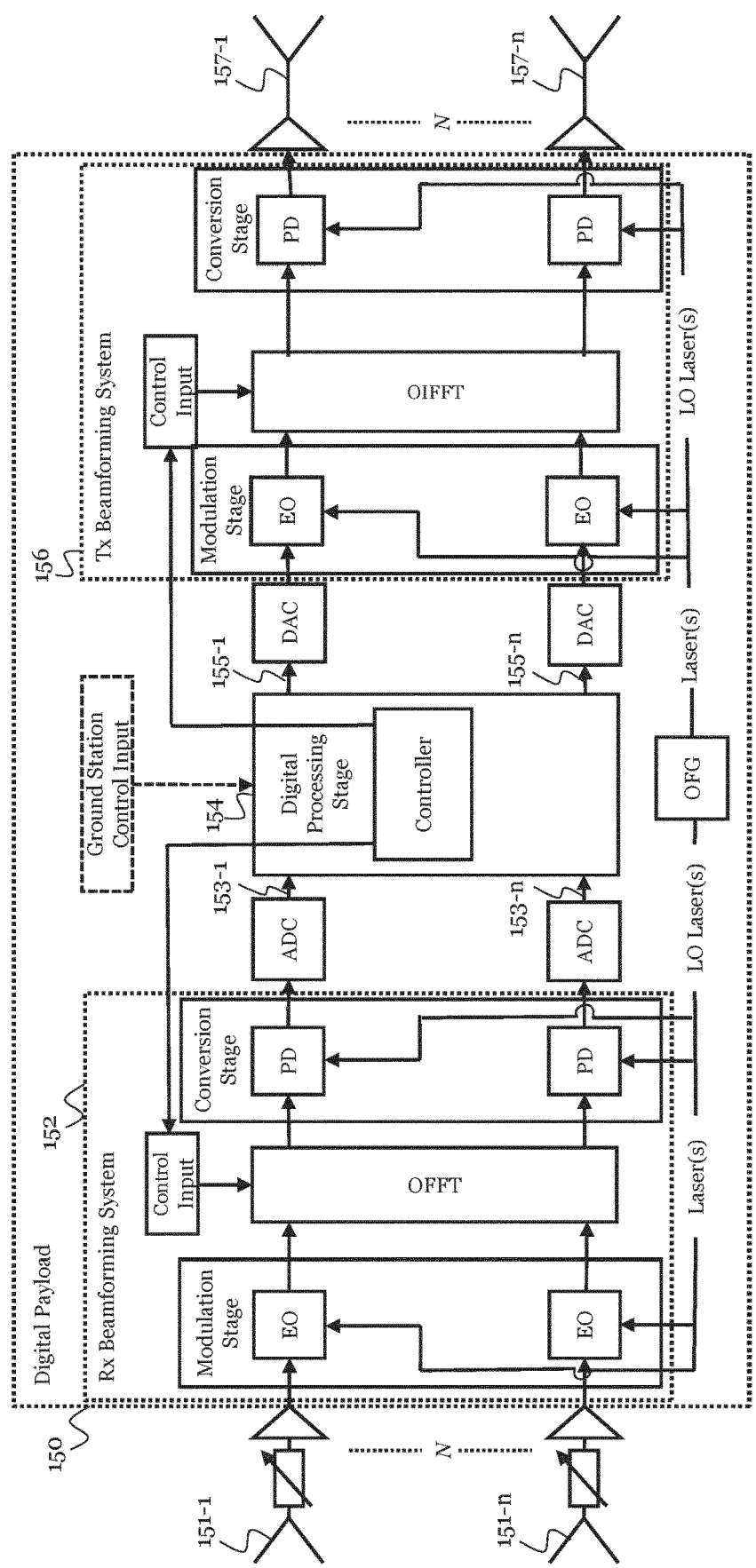
FIG. 9 shows a digital payload, with photonic Rx and Tx beamforming systems configured for output to a digital payload processor and a digital payload processor, according to embodiments of the present invention.

As described with reference to FIG. 9 the payload may be a digital payload 150 comprising one or more digital signal processors 154, according to embodiments of the present invention. Such a processor 150 may be configured to receive, as input, the output 153-1 . . . 153-n of a first Rx beamforming system 152 according to FIG. 5. Similarly, the digital processor 154 may be configured to output signals 155-1 . . . 155-n for beamforming by a second Tx beamforming system 156 according to FIG. 7. The Rx beamforming system 152 and the Tx beamforming system 156 interface with first 151-1 . . . 151-n and second 157-1 . . . 157-n antenna elements respectively. In some embodiments, the first 151-1 . . . 151-n and second 157-1 . . . 157-n antenna elements are associated with physically distinct antennas, but in alternative embodiments, the first 151-1 . . . 151-n and second 157-1 . . . 157-n antenna elements are the same elements of a single antenna array.

The digital payload 150 may operate in a manner analogous to the photonic payload 120 of FIG. 8. In addition, a digital payload 150 may provide additional or alternative functionality, for example a digital payload 150 may facilitate further digital beamforming, further resolving the directionality of the beams 153-1 . . . 153-n output by the Rx beamforming system 152.

Interference Cancellation

Figure 10:
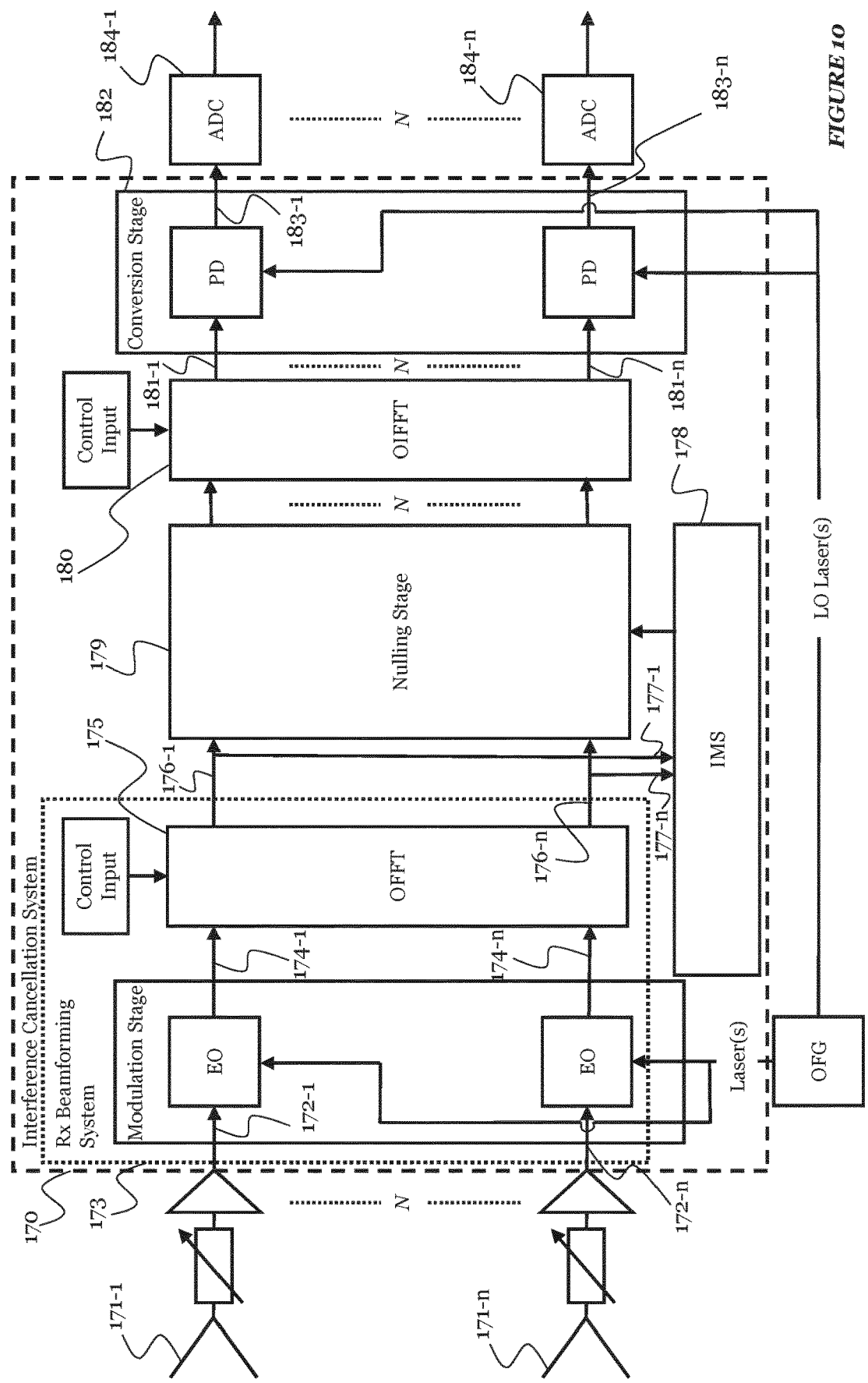
FIG. 10 shows an interference cancellation system, according to embodiments of the present invention.

As described with reference to FIG. 10, the photonic Rx beamforming system 1 of FIG. 1 may be adapted for anti-jamming, forming the interference cancellation system 170 of FIG. 10 according to embodiments of the present invention. The interference cancellation 170 system takes, as input, N signals 172-1 . . . 172-n obtained from the N Rx antenna elements 171-1 . . . 171-n and forms these signal into beams, using the Rx beamforming system 173 described earlier with reference to FIG. 1. These beams are output to an interference monitoring stage 178 and a nulling stage 179, to determine respectively the presence of, and cancel, any interfering signals. The remaining signals are output to an OIFFT network 181 which reconstructs the input signal 172-1 . . . 172-n, without the one or more interfering signals. Finally, the signals are passed through a conversion stage 182 for demodulation into electrical signals 183-1 . . . 183-n for further digital processing by a digital payload, including digital beamforming.

The interference cancellation system 170 receives signals obtained from each of N elements 171-1 . . . 171-n of an Rx antenna, converts them into the optical domain to produce N optical signals 174-1 . . . 174-n and, using the optical fast Fourier Transform (OFFT) network 175, resolves the directionality of the received signals 172-1 . . . 172-n into beams based on their respective beam angles. The process of forming the beams is performed by the Rx beamforming system 173, and is performed in the same manner as described above with reference to FIG. 1. The optional switching 11 and amplification 10 stages of the Rx beamforming system 1 of FIG. 1 are not required for the interference cancellation system 170.

The output of the OFFT network 175 comprises a series of low-gain taps 177-1 . . . 177-n on a subset of the N optical output signals 176-1 . . . 176-n, and the taps 177-1 . . . 177-n comprise photodetectors (not shown) and analogue-to-digital converters (not shown) for converting the optical signals into the digital domain. The IMS 178 operates to determine the presence of one or more interfering signals in the output of the OFFT network 175 based on, for example, comparison with an expected power level for each beam. The expected power levels are based on signals that are expected to be received in accordance with, for example, knowledge of a particular coverage scheme, and are set via a control input (not shown) either from the on-board payload controller, or from a ground station.

Having identified the presence of an interfering signal, the IMS 178 informs the nulling stage 179 of the one or more beams showing the presence of an interferer. The nulling stage 179 performs nulling or attenuation of the calculated beam angle(s) output by the OFFT network 175 using, for example, electro-absorption modulators. Gain (not shown) is applied to the remaining OFFT outputs to increase the rejection of the one or more interferer signals relative to the desired signals, which then pass through an OIFFT network 180 in order to reconstruct the N antenna element signals 181-1 . . . 182-n, but with the interferer removed.

The plurality of reconstructed signals 181-1 . . . 181-n are taken as input by a conversion stage 182, configured to convert the plurality of reconstructed signals 181-1 . . . 181-n into a plurality of reconstructed electrical signals 183-1 . . . 183-n for transmission to analogue-to-digital converters 184-1 . . . 184-n which outputs to a digital payload for further processing. The conversion stage 182 operates in manner analogous to stage 88 described with reference to the Tx beamforming system 80.

The skilled person will appreciate that a variety of configurations are possible which fall within the scope of the claims, in dependence on the specific types of photonic and digital processing to be performed, and the number of antenna elements. As such, features of embodiments described above, which are mutually compatible, can be combined as further embodiments falling within the claim scope, with at least one of optical fast Fourier transform or an optical inverse fast Fourier transform in the beamforming stage providing the advantages described herein to the satellite payload.

The invention claimed is:

1. A photonic beamforming system for a satellite payload, comprising:
   a modulation stage configured to modulate a plurality of N electrical signals from a plurality of N antenna elements receiving one or more signal beams, onto an optical carrier, to output a respective plurality of N optical signals,
   wherein $N=2^L$ for integer $L>1$; and
   a network having an input to receive the plurality of N optical signals, the network arranged to resolve the one or more signal beams into each of a predetermined plurality of N beam angles with respect to the N antenna elements to output, from an output of the network, a plurality of N beamformed signals corresponding to each of the predetermined plurality of N beam angles by, for each one of the plurality of N optical signals, summing the one of the plurality of N optical signals with each of the other N−1 of the plurality of optical signals phase shifted relative to the one of the plurality of N optical signals by a respective phase shift;
   wherein each of the respective phase shifts is such that the one of the plurality of N optical signals interferes with each of the other N−1 phase shifted plurality of optical signals when summed, to form a beamformed signal having a respective one of the predetermined N beam angles;
   wherein the network comprises a plurality of $L \cdot 2^{L-1}$ 2×2 optical couplers, each of the plurality of 2×2 optical couplers having two optical signal inputs and two optical signal outputs, each 2×2 optical coupler having a control input to control a phase shift applied by the 2×2 optical coupler between a respective pair of the plurality of N optical signals input to the two optical signal inputs of the 2×2 coupler;

wherein an optical fast Fourier transform, OFFT, is applied to the plurality of N optical signals by controlling the respective phase shift applied at each of the plurality of 2×2 optical couplers, and by arranging the plurality of 2×2 optical couplers in a sequence of L ranks of $2^{L-1}$ couplers between the input and the output of the network, wherein the L ranks comprise an output rank at the output of the network, and one or more further ranks preceding the output rank in the sequence, such that, for each of the plurality of 2×2 optical couplers in the one or more further ranks, a first of the two optical outputs is connected to an input of a first coupler in a subsequent rank in the sequence, and a second of the two optical outputs is connected to an input of a second coupler in the subsequent rank in the sequence.

2. The photonic beamforming system of claim 1, wherein each of the plurality of 2×2 optical couplers comprises a tuneable phase shifter at each of its inputs, wherein each tuneable phase shifter is controlled by a respective beamforming control input.

3. The photonic beamforming system of claim 1, wherein each of the plurality of 2×2 optical couplers comprises a tuneable phase shifter at one of its inputs, and a fixed phase shifter at the other of its inputs, wherein the tuneable phase shifter is controlled by a respective beamforming control input.

4. The photonic beamforming system of claim 1 further comprising a switching stage, configured to select a subset of the beamformed signals output by the network for processing at the payload.

5. The photonic beamforming system according to claim 4, wherein the switching stage is configured to select the subset of the beamformed signals according to a beamhopping scheme.

6. An interference cancellation system, comprising:
the photonic beamforming system of claim 1;
an interference monitoring stage configured to monitor the output of the network of the photonic beamforming system for one or more interfering signals, and determine a one or more respective interfering beam angles of the one or more interfering signals;
a nulling stage, configured to null the one or more interfering beam angles in the output of the network; and
a further network, configured to reconstruct the signal input to the photonic beamforming system by applying an inverse OFFT without the one or more interfering beam angles.

7. A photonic beamforming system for a satellite payload, comprising:
a network, having an input to receive a plurality of N optical signals, the network arranged to generate, from the plurality of N input optical signals at an output of the network, one or more beamformed signals at a respective one or more of a predetermined plurality of N beam angles with respect to the N antenna elements, by, for each one of the plurality of N optical signals, summing the one of the plurality of N optical signals with each of the other N−1 of the plurality of optical signals phase shifted relative to the one of the plurality of N optical signals by a respective phase shift,
wherein $N=2^L$ for integer L>1;
wherein each of the respective phase shifts is such that the one of the plurality of N optical signals interferes with each of the other N−1 phase shifted plurality of optical signals when summed, to form a beamformed signal having a respective one of the predetermined plurality of N beam angles; and
a conversion stage configured to convert the one or more beamformed optical signals into one or more electrical signals for transmission in the one or more beams by a plurality of antenna elements;
wherein the network comprises a plurality of $L \cdot 2^{L-1}$ 2×2 optical couplers each of the plurality of 2×2 optical couplers having two optical signal inputs and two optical signal outputs, each 2×2 optical coupler having a control input to control a phase shift applied by the 2×2 optical coupler between a respective pair of the plurality of N optical signals input to the two optical signal inputs of the 2×2 coupler;
wherein an optical inverse fast Fourier transform, OIFFT, is applied to the plurality of N optical signals by controlling the respective phase shift applied at each of the plurality of 2×2 optical couplers, and by arranging the plurality of 2×2 optical couplers in a sequence of L ranks of $2^{L-1}$ couplers between the input and the output of the network, wherein the L ranks comprise an output rank at the output of the network, and one or more further ranks preceding the output rank in the sequence, such that, for each of the plurality of 2×2 optical couplers in the one or more further ranks, a first of the two optical outputs in connected to an input of a first coupler in a subsequent rank in the sequence, and a second of the two optical outputs is connected to an input of a second coupler in the subsequent rank in the sequence.

8. The photonic beamforming system of claim 7, wherein each of the plurality of 2×2 optical couplers comprises a tuneable phase shifter at each of its inputs, wherein each tuneable phase shifter is controlled by a respective beamforming control input.

9. The photonic beamforming system of claim 7, wherein each of the plurality of 2×2 optical couplers comprises a tuneable phase shifter at one of its inputs, and a fixed phase shifter at the other of its inputs, wherein the tuneable phase shifter is controlled by a respective beamforming control input.

10. The photonic beamforming system of claim 7, further comprising an optical switch and/or splitter configured to switch and/or split at least one of the input signals into a plurality of input signals for provision to the network.

11. A photonic satellite payload comprising:
a first photonic beamforming system according to claim 1 arranged to receive a plurality of signals from a first plurality of antenna elements;
one or more photonic signal processors arranged to process the plurality of beamformed signals output by the first photonic beamforming system; and
a second photonic beamforming system arranged to receive a plurality of signals output by the one or more photonic signal processors and to output one or more transmit beams via a second plurality of antenna elements.

12. A satellite comprising a payload according to claim 11.

13. The photonic beamforming system of claim 1, wherein the modulation stage further comprises a plurality of electro-optical, EO, modulators, the photonic beamforming system further comprising:

a conversion stage, comprising a plurality of photodetectors configured to convert the plurality of beamformed signals output by the OFFT network to the electrical domain; and an optical frequency generation unit arranged to supply the optical carrier and an optical local oscillator signal for the conversion stage.

14. A satellite payload comprising:

a first photonic beamforming system according to claim 13 arranged to receive a plurality of signals from a first plurality of antenna elements;

one or more digital signal processors arranged to process the plurality of electrical beamformed signals output by the first photonic beamforming system; and a second photonic beamforming system arranged to receive a plurality of electrical signals output by the one or more digital signal processors and to output one or more transmit beams via a second plurality of antenna elements.

15. A satellite comprising a payload according to claim 14.

16. The photonic beamforming system of claim 7, further comprising:

a modulation stage configured to modulate a plurality of electrical signals from the satellite payload onto an optical carrier, to output a respective plurality of optical signals for input to the network;

wherein the conversion stage comprises a plurality of photodetectors;

the photonic beamforming system further comprising an optical frequency generation unit arranged to supply the optical carrier and an optical local oscillator signal for the conversion stage.

* * * * *